United States Patent
Orimo

(10) Patent No.: US 10,046,667 B2
(45) Date of Patent: Aug. 14, 2018

(54) DETACHABLE BATTERY PACK AND ELECTRIC VEHICLE

(71) Applicant: YAMAHA HATSUDOKI KABUSHIKI KAISHA, Iwata-shi, Shizuoka (JP)

(72) Inventor: Toshiro Orimo, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 12 days.

(21) Appl. No.: 15/356,752

(22) Filed: Nov. 21, 2016

(65) Prior Publication Data

US 2017/0259692 A1    Sep. 14, 2017

(30) Foreign Application Priority Data

Mar. 14, 2016 (JP) ................. 2016-050021

(51) Int. Cl.
| | |
|---|---|
| B60L 11/00 | (2006.01) |
| B60L 11/18 | (2006.01) |
| H01M 2/10 | (2006.01) |
| H01M 10/0525 | (2010.01) |

(52) U.S. Cl.
CPC ....... B60L 11/1879 (2013.01); B60L 11/1807 (2013.01); H01M 2/1083 (2013.01); B60L 2200/12 (2013.01); H01M 10/0525 (2013.01); H01M 2220/20 (2013.01); Y02E 60/122 (2013.01)

(58) Field of Classification Search
None
See application file for complete search history.

(56) References Cited

U.S. PATENT DOCUMENTS

2013/0216885 A1* 8/2013 Kawatani ............ H01M 2/1083
429/100

FOREIGN PATENT DOCUMENTS

| JP | 2013-169860 A | 9/2013 |
|---|---|---|
| JP | 2013-177106 A | 9/2013 |

* cited by examiner

Primary Examiner — James A Shriver, II
Assistant Examiner — Hilary L Johns
(74) Attorney, Agent, or Firm — Keating and Bennett, LLP

(57) ABSTRACT

A battery pack includes non-parallel longer and shorter axes. A virtual first plane includes the shorter axis and an end surface of the battery pack, a virtual second plane includes the longer axis and another end surface of the battery pack, and a virtual third plane is perpendicular or substantially perpendicular to the longer axis and includes the center of gravity of the battery pack. The battery pack includes first and second grips, respectively at least partially located in the first and second planes. The first grip allows the battery pack to be carried such that the longer axis extends in the vertical direction. The second grip allows the battery pack to slide along the first plane. The first grip and at least a portion of the second grip are located on the same side with respect to the third plane.

12 Claims, 14 Drawing Sheets

DETACHABLE BATTERY PACK AND ELECTRIC VEHICLE

BACKGROUND OF THE INVENTION

1. Field of the Invention

The present invention relates to a portable battery pack attachable to, or detachable from an electric vehicle, and an electric vehicle including the battery pack mounted thereon.

2. Description of the Related Art

Recently, electric vehicles such as electric motorbikes, electric bicycles and the like have been widely used. An electric vehicle uses electric power from a battery pack charged in advance to rotate a motor and thus obtains a driving force.

Among these electric vehicles, there is a model that uses a detachable battery pack. As compared with a four-wheel drive vehicle, an electric vehicle such as an electric motorbike or the like is restricted as to the position at which the battery pack is mounted. In such a situation, improvements have been made to the attachment and detachment of the battery pack.

Japanese Laid-Open Patent Publications Nos. 2013-177106 and 2013-169860 both disclose a detachable battery pack (battery module).

The battery module described in Japanese Laid-Open Patent Publication No. 2013-177106 has a lengthy rectangular parallelepiped shape. A battery case of the electric vehicle that accommodates the battery module also has a lengthy box shape, and includes an opening directed upward in the vertical direction. A user grasps a handle of the battery module to insert or detach the battery pack through the opening of the battery case along a longitudinal side of the battery module. The handle is located on a top surface (surface opposite to a bottom surface) in the state where the battery module stands with the longitudinal side extending in the vertical direction. The user may use the handle to insert or pull out the battery module and also to carry the battery module.

The battery pack described in Japanese Laid-Open Patent Publication No. 2013-169860 also has a rectangular parallelepiped shape. In the state where the battery pack is accommodated in a battery case, a concave curved surface at a bottom surface of the battery back and a convex curved surface of the battery case, which are parallel to each other, are in engagement with each other. For detaching the battery pack from the battery case, the user rotates the battery pack using a portion of the bottom surface (the portion at which the concave curved surface and the convex curved surface are engaged with each other) as a rotation axis while grasping a handle located at a corner of a top surface of the battery pack and then lifts the battery pack. The battery pack is detached in this manner. For attaching the battery pack, the user places the concave curved surface at the bottom surface of the battery pack and the convex curved surface of the battery case into engagement with each other, rotates the battery pack around the above-described rotation axis while grasping the handle to fit the battery pack into the battery case.

In Japanese Laid-Open Patent Publication No. 2013-177106, the battery module needs to have a structure capable of being pulled out in the longitudinal direction thereof with no other choice because of the relationship with other components of the electric vehicle. However, such an accommodation mechanism requires the user to pull out the battery pack, which is heavy, in the longitudinal direction thereof. The distance by which the battery pack is pulled out is relatively long.

The accommodation mechanism in Japanese Laid-Open Patent Publication No. 2013-169860 requires the provision of a space to permit the rotation of the battery pack or a mechanism to provide the rotation (the concave curved surface of the battery pack and the convex curved surface of the battery case). This enlarges and complicates the structure. It is difficult to obtain, with certainty, a space to install such a large battery pack because of the layout of the vehicle, and the complicated structure of the battery pack also raises the cost.

SUMMARY OF THE INVENTION

Preferred embodiments of the present invention provide a battery pack that has a simple structure and is easily attachable to, and detachable from, an electric vehicle.

A battery pack according to a preferred embodiment of the present invention has a shape including a longer axis and a shorter axis that are not parallel to each other, is attachable to, or detachable from, an electric vehicle, and is portable. In a state where a virtual first plane is defined as including the shorter axis and an end surface of the battery pack and not including the longer axis, a virtual second plane is defined as including the longer axis and another end surface of the battery pack, and a virtual third plane is defined as being perpendicular or substantially perpendicular to the longer axis and including the center of gravity of the battery pack, the battery pack includes a first grip on the first plane, the first grip allowing the battery pack to be carried in a state where the longer axis extends in the vertical direction; and a second grip on the second plane, the second grip allowing the battery pack to slide in the electric vehicle along the first plane at the time of detachment of the battery pack from, or attachment of the battery pack to, the electric vehicle. The first grip and at least a portion of the second grip are located on the same side with respect to the third plane.

In a preferred embodiment of the present invention, the second grip is spaced away from the first grip by a predetermined distance.

In a preferred embodiment of the present invention, the second grip is smaller than the first grip.

In a preferred embodiment of the present invention, the second grip is deformable.

In a preferred embodiment of the present invention, the battery pack further includes at least one battery cell, and a power output connector electrically connectable with the electric vehicle. The first grip, at least a portion of the second grip, and the power output connector are located on the same side with respect to the third plane.

In a preferred embodiment of the present invention, the entire the second grip is located on the same side with respect to the third plane.

In a preferred embodiment of the present invention, the power output connector is located at a corner portion of the battery pack.

An electric vehicle according to another preferred embodiment of the present invention includes the battery pack described above; and a case accommodating the battery pack, the case including an inner wall parallel or substantially parallel to the first plane in a state where the battery pack is accommodated in the case. The inner wall guides the battery pack at the time of attachment of the battery pack to, or detachment of the battery pack from, the case.

In a preferred embodiment of the present invention, the case accommodates the battery pack in a state where the battery pack is inclined with respect to the vertical direction.

In a preferred embodiment of the present invention, the battery pack includes at least one battery cell and a power output connector that outputs electric power of the at least one battery cell; and, when the case accommodates the battery pack, the power output connector is located at a relatively upper portion of the battery pack in an inclined state.

In a preferred embodiment of the present invention, the case further accommodates a power input connector; and in a state where the battery pack is accommodated in the case, the power output connector and the power input connector are connected with each other at a relatively upper portion of the battery pack in an inclined state.

In a preferred embodiment of the present invention, the electric vehicle further includes an electric motor drivable by electric power received via the power input connector; and a driver that transmits a driving force of the electric motor.

A battery pack according to a preferred embodiment of the present invention includes the first grip located on the first plane and thus is portable with the longer side thereof being parallel or substantially parallel to the vertical direction. Thus, the battery pack has good portability. The second grip is located on the second plane including the longer axis of the battery pack, and allows the battery pack to slide in the electric vehicle along the first plane, namely, along the shorter axis at the time of detachment of the battery pack from the electric vehicle. As compared with the case where the battery pack is slid in the longer axis direction, the distance by which the battery pack is pulled out is decreased, and thus the load on the user is reduced. The first grip and at least a portion of the second grip are located on the same side with respect to the third plane, which is perpendicular or substantially perpendicular to the longer axis and includes the center of gravity of the battery pack. Therefore, it is easy to replace the second grip with the first grasp, or vice versa, as the grip to be grasped. After the battery pack is pulled out from the case, the center of gravity of the battery pack is moved downward along the motion of lifting the battery pack by using the second grip. Therefore, the first grip is rotated to the same side as the second grip, and thus the short axis side is lifted upward.

The second grip is spaced away from the first grip by a predetermined distance. Therefore, the second grip may be located at a position from which the battery pack is easily pulled out, independently from the first grip.

In the case where the second grip is smaller than the first grip, the space to install the second grip is smaller.

In the case where the second grip is deformable, the second grip does not prevent the lid from being locked on the battery pack after the battery pack is attached to the case.

In the case where the first grip, at least a portion of the second grip, and the power output connector are located on the same side with respect to the third plane, the operability of connecting the power output connector with the power input connector after the battery pack is accommodated in the case is improved.

An electric vehicle according to a preferred embodiment of the present invention includes the case including an inner wall parallel or substantially parallel to the first plane in a state where the battery pack is accommodated in the case. The inner wall guides the battery pack at the time of attachment of the battery pack to, or detachment of the battery pack from, the case. Thus, the battery pack is slidable along the inner wall. Therefore, the case does not need to include a space that permits the rotation of the battery pack. This prevents the structure of elements of the electric bicycle that are located in the vicinity of the case from becoming complicated, and the space occupied by these elements from being decreased.

The battery pack is inclined with respect to the vertical direction. In the case where, for example, the first grip and the second grip are located at an upper position on the battery pack in the inclined state, the user attaches or detaches the battery pack more easily by using the second grip than in the case where the grips are located at a lower position. After the battery pack is detached, it is easy to replace the second grip with the first grip as the grip to be grasped. In the case where the power output connector is located at an upper position on the battery pack in the inclined state, the operability of the user is improved when connecting the power output connector with the power input connector, which is located on the vehicle side.

In a preferred embodiment of the present invention, among the first grip and the second grip of the battery pack, the first grip is located on the first plane including the shorter axis but not including the longer axis, and allows the battery pack to be carried with the longer axis extending in the vertical direction. Since the first grip is located on the first plane, the battery pack is carried with the longer side thereof being parallel or substantially parallel to the vertical direction. Thus, the battery pack has good portability.

The second grip is located on the second plane including the longer axis of the battery pack, and allows the battery pack to slide in the electric vehicle along the first plane, namely, along the shorter axis at the time of detachment of the battery pack from, or attachment of the battery pack to, the electric vehicle. As compared with the case where the battery pack is slid in the longer axis direction, the distance by which the battery pack is pulled out is decreased, and thus the load on the user is reduced.

The first grip and at least a portion of the second grip are located on the same side with respect to the third plane, which is perpendicular or substantially perpendicular to the longer axis and includes the center of gravity of the battery pack. Therefore, it is easy to replace the second grip with the first grip, or vice versa, as the grip to be grasped. After the battery pack is pulled out from the case, the center of gravity of the battery pack is moved downward along the motion of lifting the battery pack by using the second grip. Therefore, the first grip is rotated to the same side as the second grip, and thus the short axis side is lifted upward.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 14 shows how the battery pack 200 is detached by use of the assisting ring 50a.

DETAILED DESCRIPTION OF THE PREFERRED EMBODIMENTS

Hereinafter, a battery pack and an electric vehicle according to preferred embodiments of the present invention will be described with reference to the attached drawings.

In this specification, a straddle-type electric bicycle will be described as an example of preferred embodiments of the electric vehicle. This is merely an example. The electric vehicle may be an electric bicycle other than the straddle-type electric bicycle, or a vehicle including one, or three or more wheels such as an electric tricycle or the like. The following preferred embodiments are merely examples, and the present invention is not limited to the following preferred embodiments. In the description of the following preferred embodiments, the same or substantially the same elements will bear the identical reference signs, and overlapping descriptions may be omitted.

Figure 1:
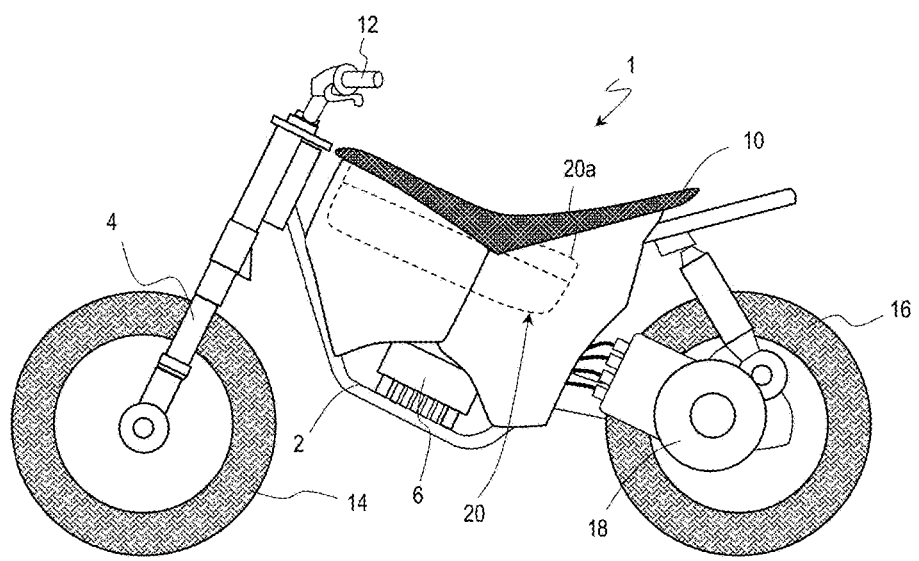
FIG. 1 is a side view of an electric bicycle 1.

FIG. 1 is a side view showing an external structure of an electric bicycle 1 according to a preferred embodiment of the present invention.

As shown in FIG. 1, the electric bicycle 1 includes a vehicle body 2, a front fork 4, a motor controller 6, a seat 10, a steering handle 12, a front wheel 14, a rear wheel 16, an electric motor 18, and a battery accommodation case 20.

The vehicle body 2 includes a vehicle frame and a vehicle cover. Various components of the electric bicycle 1, for example, the front fork 4, and also the electric motor 18, the battery accommodation case 20 and the like described below, are attached to the vehicle body 2.

The steering handle 12 is attached to a top end of the front fork 4. The front wheel 14 is attached to a bottom end of the front fork 4. The rear wheel 16 and the electric motor 18 are supported by the vehicle body 2. In the present preferred embodiment, the driving wheel is the rear wheel 16 and the subordinate wheel is the front wheel 14.

The motor controller 6 receives electric power accumulated in a battery pack described below and performs electric power control to rotate the electric motor 18. The rotation of the electric motor 18 is transmitted to the rear wheel 16 via a driver such as a gear or the like, and thus the electric bicycle 1 runs.

The battery accommodation case 20 includes a lid 20a, and is mounted below the seat 10 with the lid 20a being closed. The accommodation case 20 accommodates the battery pack. In the present preferred embodiment, the battery pack is attachable to, or detachable from, the electric bicycle 1 and is portable by a human.

Figure 2:
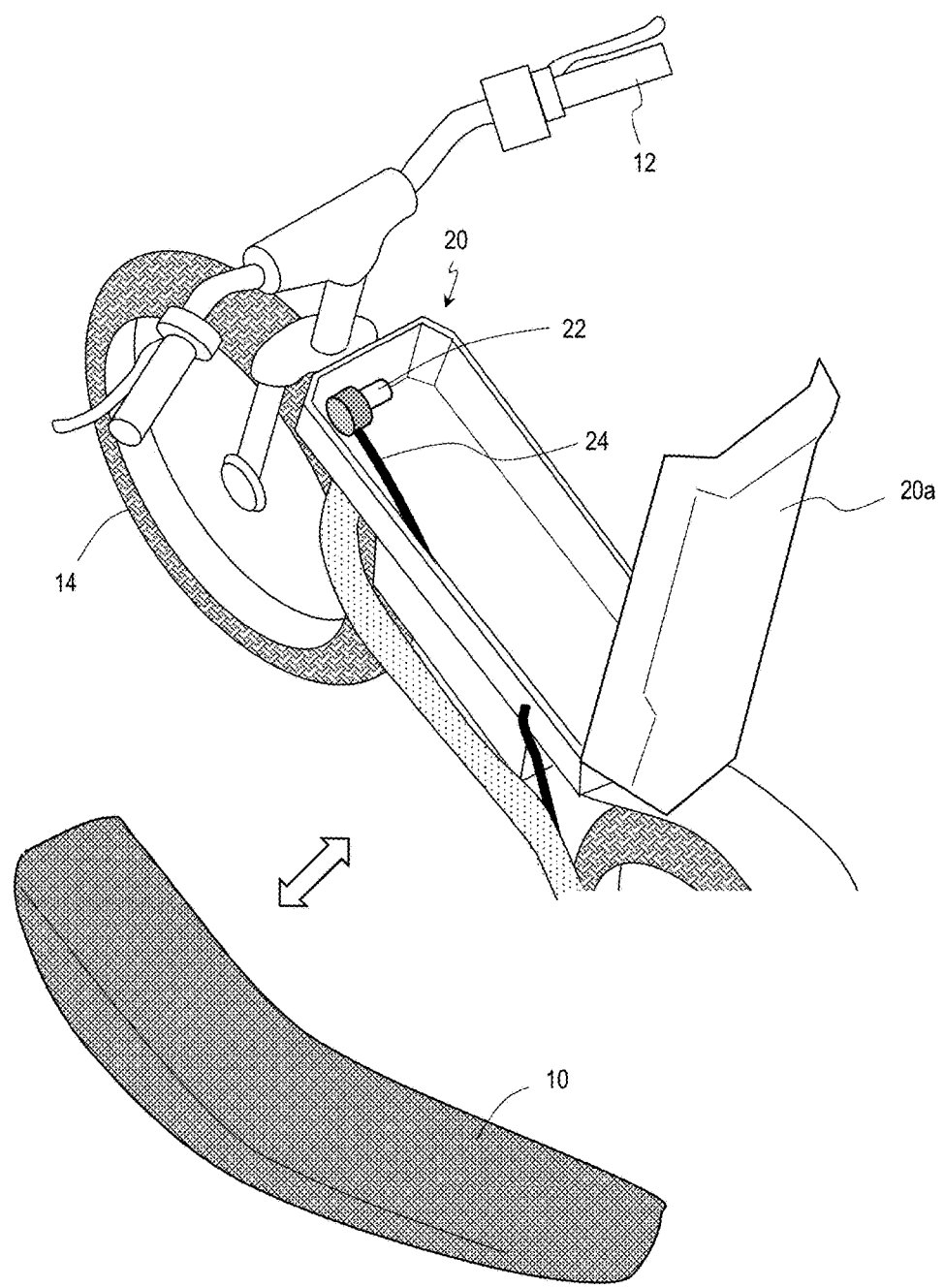
FIG. 2 shows an internal structure of a battery accommodation case 20 provided in the electric bicycle 1.

FIG. 2 is an isometric view showing an internal structure of the battery accommodation case 20 provided in the electric bicycle 1. A user removes the seat 10 and flips up the lid 20a of the battery accommodation case 20, and thus accesses the inside of the battery accommodation case 20. FIG. 2 shows the removed seat 10 and the battery accommodation case 20 with the lid 20a being flipped up. In the figures referred to below, the seat 10 is removed and is not shown unless the seat 10 is especially necessary.

The battery accommodation case 20 accommodates the battery pack. The battery accommodation case 20 also accommodates a power input connector 22 connecting the electric bicycle 1 and the battery pack to each other, and a cable 24. The power input connector 22 and the cable 24 are provided on an inner wall of the battery accommodation case 20. The cable 24 has a length that is at least sufficiently long to be connected with a power output connector of the battery pack in the state where the battery pack is attached.

Figure 3:
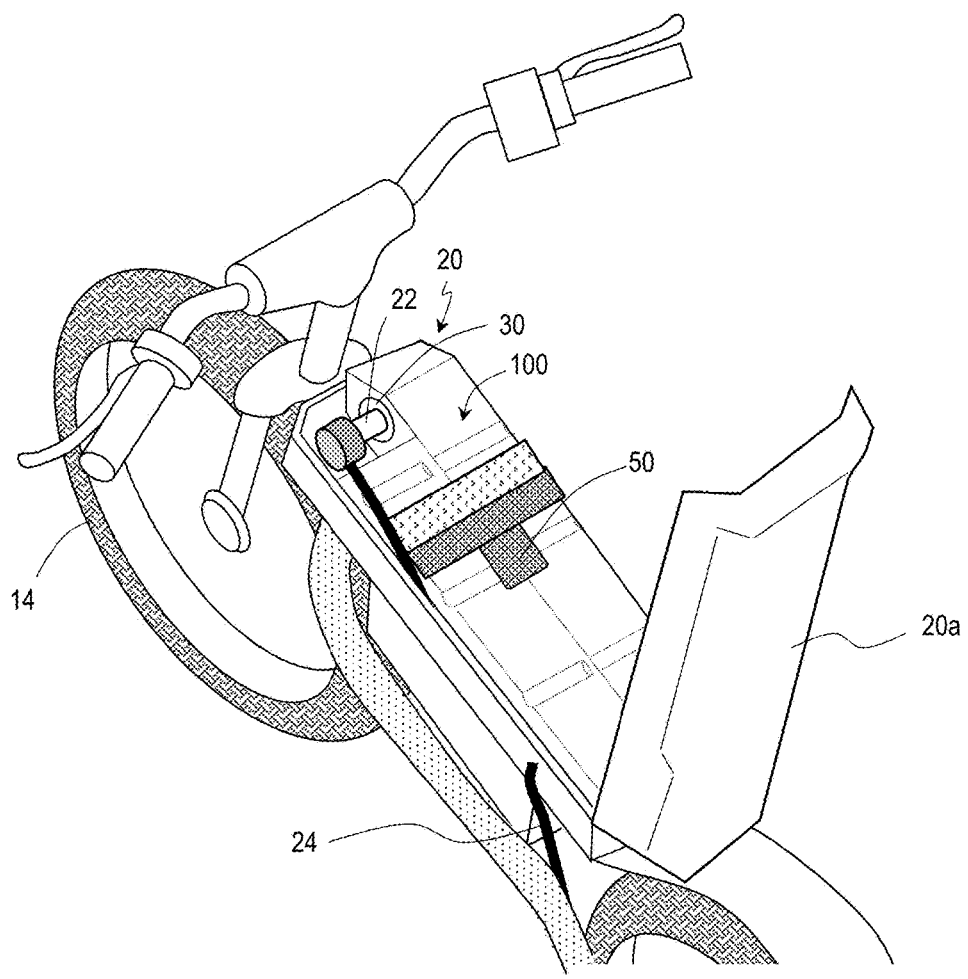
FIG. 3 shows a state where the battery pack 100 is accommodated in the battery accommodation case 20.

FIG. 3 is an isometric view showing the battery accommodation case 20 in the state of accommodating the battery pack (represented by reference sign 100). There is no space permitting the battery pack 100 to be moved between the battery accommodation case 20 and the battery pack 100. This is to prevent the battery pack 100 from wobbling while the electric bicycle 1 is running. In the present preferred embodiment, the battery accommodation case 20 has a depth that is designed that the battery pack 100 is not entirely accommodated in the battery accommodation case 20. Specifically, the depth of the battery accommodation case 20 is set such that when seen in a side view of the electric bicycle 1 accommodating the battery pack 100 in the state where the lid 20a is open, the power output connector 30 of the battery pack 100 is visually recognizable. Such a design provides a relatively large space in which the power input connector 22 and the power output connector 30 are connected to each other, and thus improves the ease of work of the user.

When the battery pack 100 is accommodated in the battery accommodation case 20, the power output connector 30 of the battery pack 100 and the power input connector 22 of the electric bicycle 1 are electrically connected to each other. Typically, the user holds the power input connector 22 with his/her hand and inserts the power input connector 22 into the power output connector 30. Thus, the power input connector 22 and the power output connector 30 are connected to each other. Alternatively, the battery accommodation case 20 may include an automatic connector mechanism so that the connection by the user is not necessary. For example, a mechanism may be provided that, when the battery pack 100 is accommodated, receives the weight thereof to move the power input connector 22 toward the power output connector 30. When the battery pack 100 is properly accommodated in the battery accommodation case 20, such a mechanism pushes the power input connector 22 into the power output connector 30 to establish the electric connection of the connectors 22 and 30. In this manner, the electric bicycle 1 uses the electric power accumulated in a battery cell (described below) provided in the battery pack 100. Specifically, the electric power is transmitted to the motor controller 6 via the power output connector 30, the power input connector 22, and the cable 24. The motor controller 6 performs a predetermined control to supply the electric power to the electric motor 18, and thus drives the electric motor 18.

The battery pack 100 is, for example, an lithium ion battery, and has an output voltage of, for example, 72 V. This value of the output voltage is an example, and the output voltage may be of a different value. For example, the output voltage may be 36 V, 48 V, 60 V or the like.

The battery pack 100 includes an assisting grip 50. The assisting grip 50 will be described in detail below.

In this specification, the accommodation of the battery pack 100 in the battery accommodation case 20 may be referred to as "attachment". The pull-out or removal of the battery pack 100 from the battery accommodation case 20 may be referred to as "detachment". Both of the attachment and the detachment may be referred to as "attachment/detachment".

Figure 4:
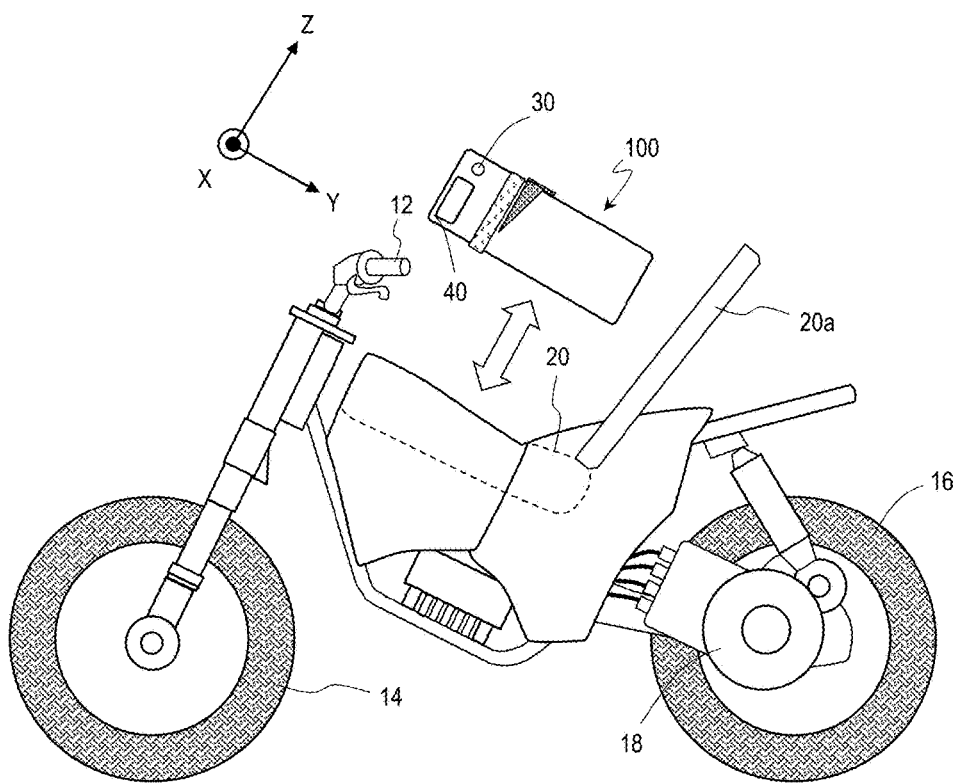
FIG. 4 shows a direction in which the battery pack 100 is moved in order to be attached to, or detached from, the battery accommodation case 20.

FIG. 4 shows a direction in which the battery pack 100 is moved in order to be attached to, or detached from, the battery accommodation case 20. The battery pack 100 preferably has a rectangular or substantially rectangular parallelepiped shape, for example. The term "substantially" is used because the battery pack 100 does not need to be strictly rectangular parallelepiped. A reason for this is that the external shape of the battery pack 100 is usually determined in consideration of various conditions.

As shown in FIG. 4, an X axis, a Y axis and a Z axis are defined. The X axis is an axis extending in a direction perpendicular with respect to the sheet of the figure. A positive direction of the X axis is directed toward the viewer of the figure from the side farther from the viewer. In this specification, any shape with which a longer axis (Y axis) and a shorter axis (Z axis) perpendicular to each other and an axis (X axis) perpendicular to both of the Y axis and the Z axis may be virtually set is referred to as being "rectangular or substantially rectangular parallelepiped". The longer axis and the shorter axis are respectively parallel or substantially parallel to the Y axis and the Z axis. For easier understanding, the expressions "longer axis (Y axis)" and "shorter axis (Z axis)" may be used in this specification.

Figure 5:
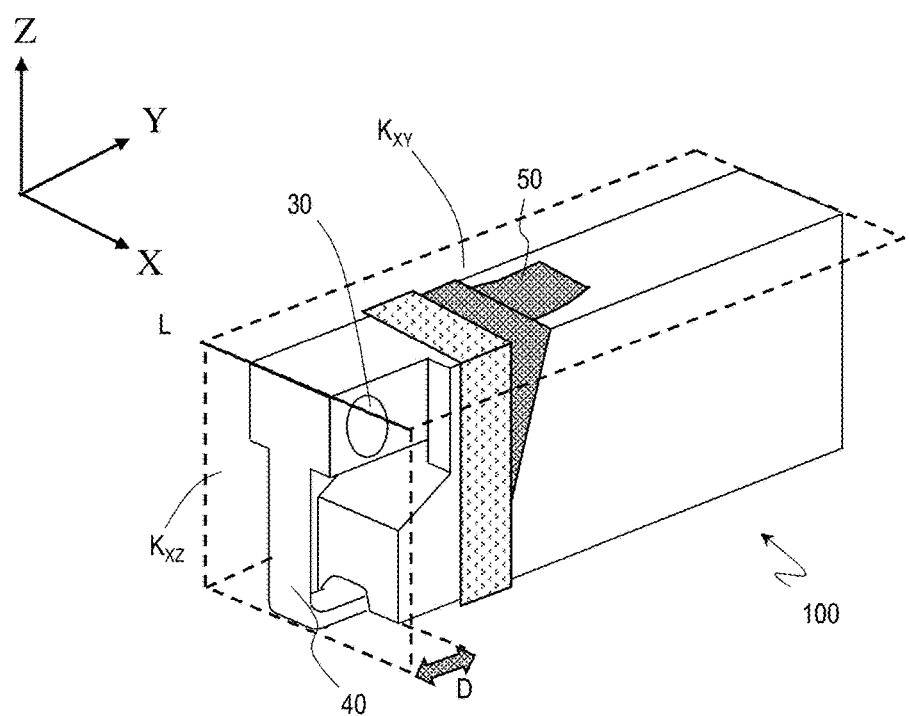
FIG. 5 is an external isometric view of the battery pack 100.

In this specification, as shown in FIG. 5, two virtual planes are defined.

FIG. 5 is an external isometric view of the battery pack 100. As shown in FIG. 5, the X axis, the Y axis and the Z axis are defined, and two virtual planes, namely, an XY plane ($K_{XY}$) and an XZ plane ($K_{XZ}$) are defined. The plane $K_{XY}$ is a plane including the longer axis (Y axis) and including at least a portion of an end surface of the battery pack 100 on the +Z axis side. The plane $K_{XZ}$ is a plane including the shorter axis (Z axis) and including at least a portion of an end surface of the battery pack 100 on the −Y axis side. The plane $K_{XY}$ and the plane $K_{XZ}$ cross each other to define an intersection line L. The intersection line L is parallel or substantially parallel to the X axis.

The battery pack 100 includes a main grip 40 that extends a distance D in the Y axis direction and includes the plane $K_{XZ}$. The main grip 40 preferably includes a portion of the battery pack 100, for example, a portion made by molding or the like. The power output connector 30 is located in the vicinity of the intersection line L and preferably in a corner of the battery pack 100. The assisting grip 50 is spaced away from the main grip 40 by a certain distance. In the state where the battery pack 100 is accommodated in the battery accommodation case 20, even if the main grip 40 is inside the battery accommodation case 20, the assisting grip 50 may be located at a position from which the battery pack 100 is easily pulled out, independently from the main grip 40. The assisting grip 50 is provided in a space including the plane $K_{XY}$. In this specification, the expressions "the main grip 40 is provided in the plane $K_{XZ}$" and "the assisting grip 50 is provided in the plane $K_{XY}$" may be used. These expressions are simplified expressions of the above description.

In the present preferred embodiment, the battery pack 100 preferably has a rectangular or substantially rectangular parallelepiped shape, for example. The battery pack is not limited to such a shape. The battery pack may have any shape in which a longer axis and a shorter axis that are not parallel to each other may be virtually defined. For example, the battery pack may have a cylindrical, elliptic-cylindrical, conical or the like, or cubic shape. In such a case, two planes that are perpendicular or substantially perpendicular to each other and respectively include the longer axis and the shorter axis may be treated as the plane $K_{XY}$ and the plane $K_{XZ}$.

As shown in FIG. 4, the battery pack 100 is attached or detached along the Z axis direction. The battery accommodation case 20 also includes a bottom surface that is parallel or substantially parallel to the plane $K_{XY}$, two inner walls facing each other and that are parallel or substantially parallel to the plane $K_{XZ}$, and two inner walls facing each other and that are parallel or substantially parallel to a plane YZ. For attaching or detaching the battery pack 100, the inner walls parallel or substantially parallel to the plane $K_{XZ}$ and the inner walls parallel or substantially parallel to the plane YZ guide the battery pack 100. Since the battery pack 100 is slidable in a direction of the plane $K_{XZ}$, the battery accommodation case 20 does not need to include, for example, a space that permits the battery pack 100 to rotate. This prevents the structure of elements of the electric bicycle 1 that are provided in the vicinity of the battery accommodation case 20 from becoming complicated, and the space occupied by these elements from being decreased. A guide rail may be provided to guide the battery pack 100, instead of the battery pack 100 being guided along the inner walls.

The direction in which the battery pack 100 is attached or detached is along or substantially along the plane $K_{XZ}$ including the shorter axis of the battery pack 100. By contrast, in the conventional art, the battery pack is pulled out along the plane $K_{XY}$ including the longer axis. As compared with the conventional art, the present preferred embodiment decreases the distance by which the battery pack 100 has to be pulled out. Since the battery pack 100 is relatively heavy, the present preferred embodiment significantly reduces the load on the user.

As can be understood from FIG. 4, the battery pack 100 is accommodated in the battery accommodation case 20 with the main grip 40 being directed downward. As a result, the power output connector 30 is located on the side of the opening of the battery accommodation case 20. This allows the user to easily connect the power output connector 30 and the power input connector 22 to each other.

However, with such an insertion method, the user cannot use the main grip 40 to attach the battery pack 100 to, or detach the battery pack 100 from, the battery accommodation case 20. For this reason, the assisting grip 50 is used.

Figure 6:
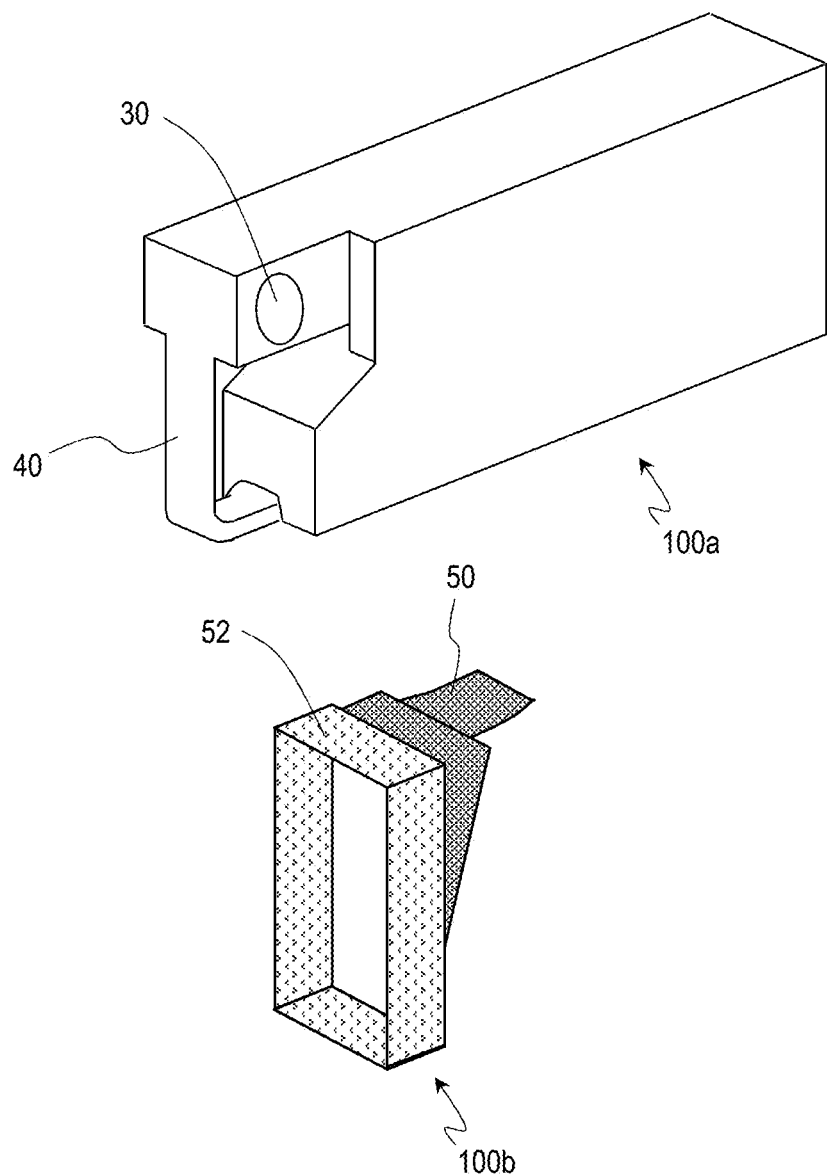
FIG. 6 shows a battery pack main body 100a and an assisting component 100b included in the battery pack 100.

FIG. 6 shows a battery pack main body 100a and an assisting component 100b included in the battery pack 100. The assisting component 100b includes, for example, a rectangular attachment band 52 and the assisting grip 50 attached to the attachment band 52. The assisting component 100b is placed around, and secured to, the battery pack main body 100*a* by the attachment band 52. The assisting component 100*b* does not need to be provided as an integral portion of the battery pack main body 100*a*, unlike the main grip 40, and may be separately prepared and placed around the battery pack main body 100*a*. This reduces the production cost and is advantageous to the manufacturer.

The assisting grip 50 preferably has the shape of a tab and may be made of reinforced rubber, for example. The assisting grip 50 is structured such that the user holds the assisting grip 50 between a plurality of his/her fingers and thus attaches the battery pack 100 to, or detaches the battery pack 100 from, the battery accommodation case 20. The assisting grip 50 has a strength that is at least sufficient to bear, against the gravity, the load applied thereto when the battery pack 100 is lifted from the battery accommodation case 20. The strength of the assisting grip 50 also sufficiently bears the flexing thereof the at the time of attachment or detachment thereof. The load bearing performance and the flex resistance performance of the assisting grip 50 vary in accordance with the design specifications including the weight, volume, assumed number of times of attachment/detachment, and the like of the battery pack 100. The assisting grip 50 is preferably smaller than the main grip 40. Therefore, the space needed to accommodate the assisting grip 50 is smaller. For example, the assisting grip 50 is preferably thin, which decreases the space between the battery pack 100 and the lid 20*a* to a sufficiently small size. In addition, when the battery pack 100 is accommodated in the battery accommodation case 20 and the lid 20*a* that has been flipped up is returned to the original position thereof, the lid 20*a* is not prevented from being locked by the assisting grip 50.

In the meantime, the main grip 40 is used when the battery pack 100 is carried. In general, as the length of an item in the longer axis direction is longer with respect to the length in the shorter axis direction, the item is easier to carry. This is why the provision of the main grip 40 is especially advantageous. The load bearing performance of the main grip 40 is designed to sufficiently bear the mass of the battery pack 100.

Figure 7:
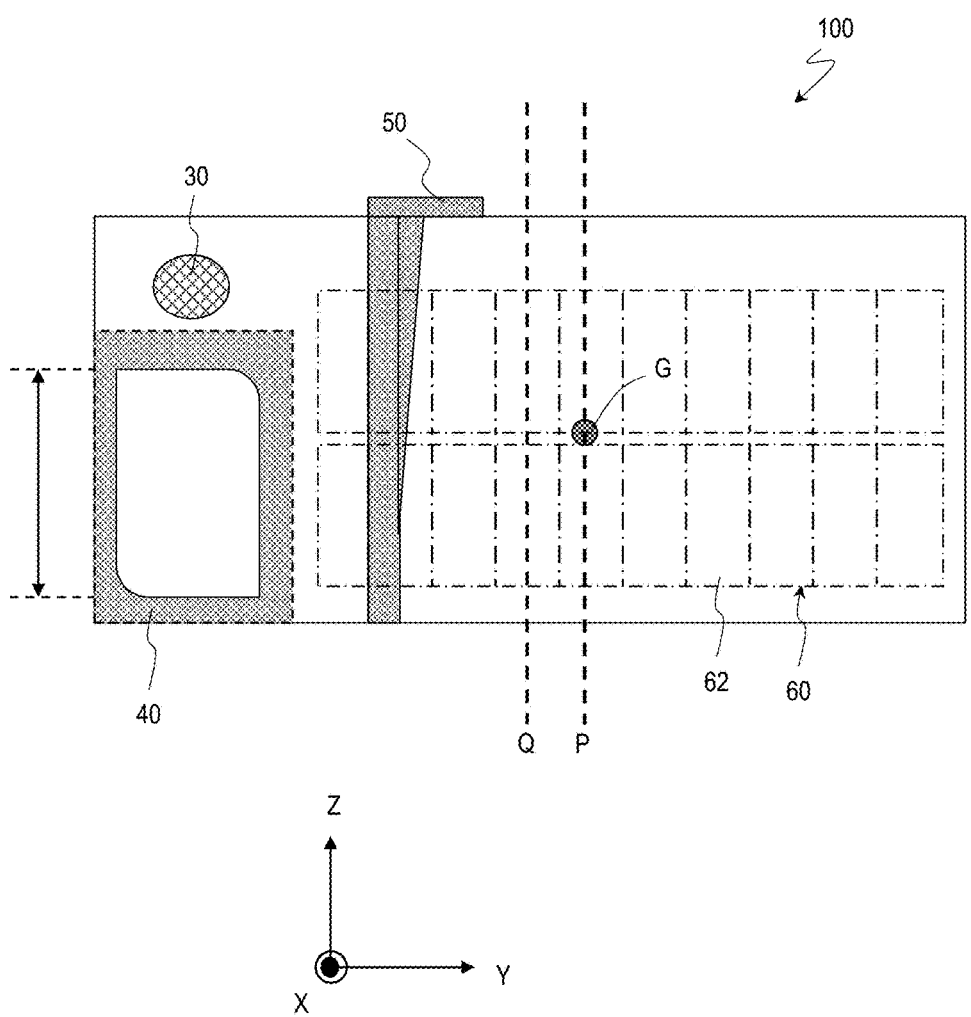
FIG. 7 shows the relationship between the positions of a main grip 40 and an assisting grip 50 and the position of the center of gravity G of the battery pack 100.

FIG. 7 shows the relationship between the positions of the main grip 40 and the assisting grip 50 and the position of the center of gravity G of the battery pack 100. The position of the center of gravity G is defined by the weight distribution of the entire battery pack 100. In the case of the battery pack 100, the mass of a built-in battery 60 including one or more battery cells 62 accounts for a majority of the mass of the battery pack 100. Therefore, the position of the center of gravity G is heavily dependent on the mass of the built-in battery 60.

The main grip 40 and the assisting grip 50 are preferably located on the same side with respect to a plane P. The plane P is a virtual plane that is defined as including the position of the center of gravity G and being parallel or substantially parallel to the plane $K_{XZ}$. With such a structure, when detaching the battery pack 100 from the battery accommodation case 20, the user very easily replaces the assisting grip 50 with the main grip 40 as the grip to be grasped. A reason for this is as follows.

Figure 8:
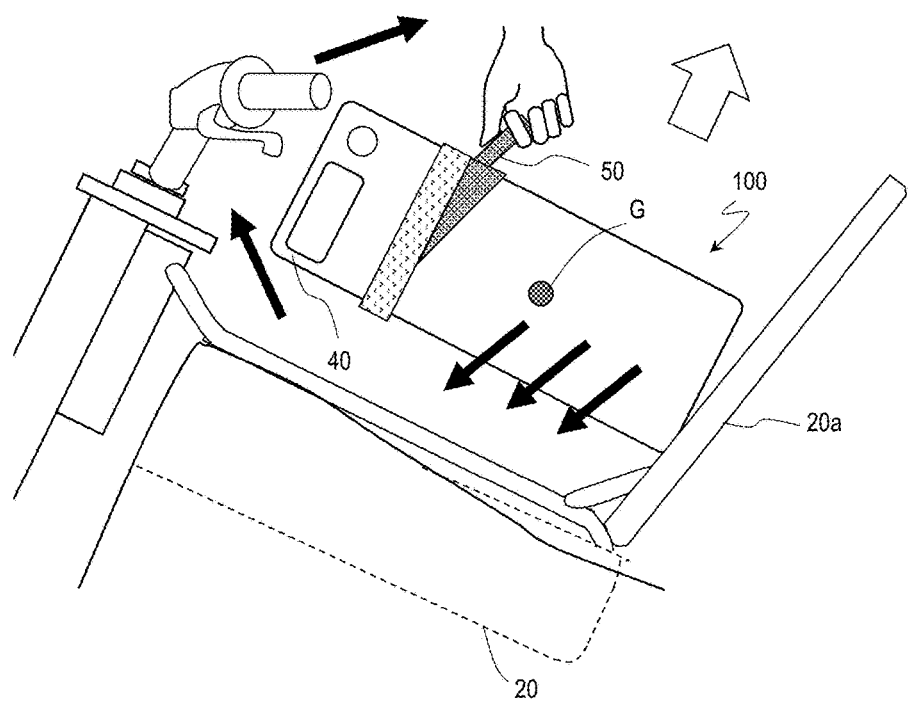
FIG. 8 shows how a user picks up the assisting grip 50 of the battery pack 100 to detach the battery pack 100 from the battery accommodation case 20.
Figure 9:
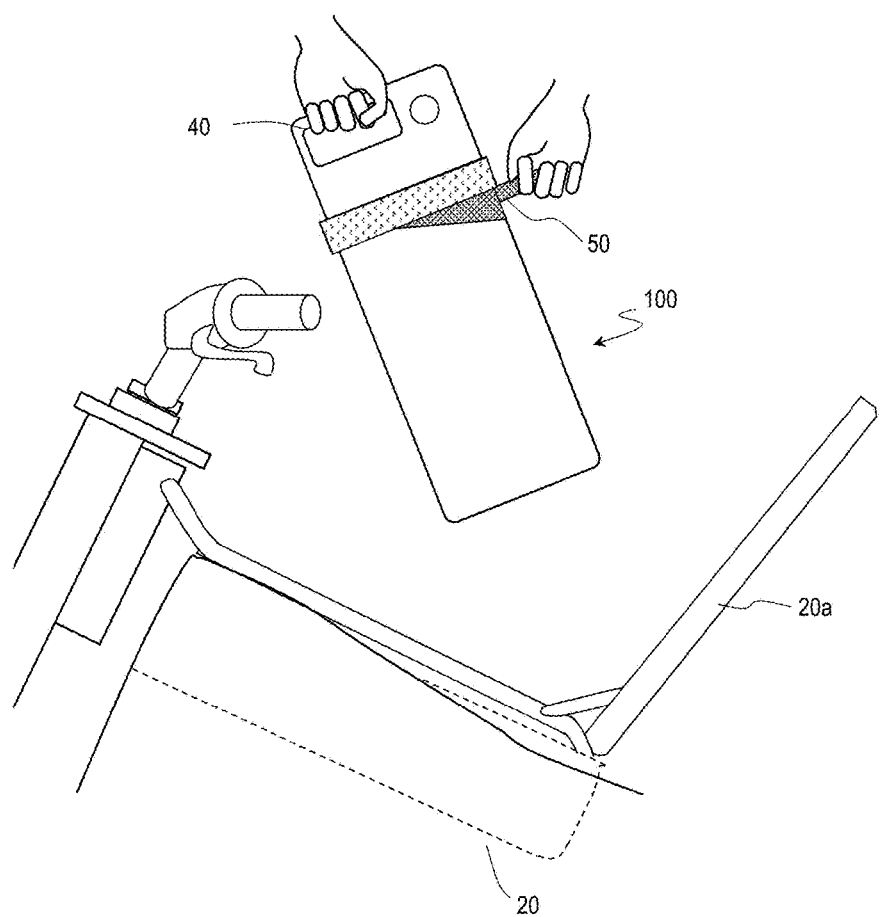
FIG. 9 shows a state immediately before the user replaces the assisting grip 50 with the main grip 40 as the grip to be grasped.
Figure 10:
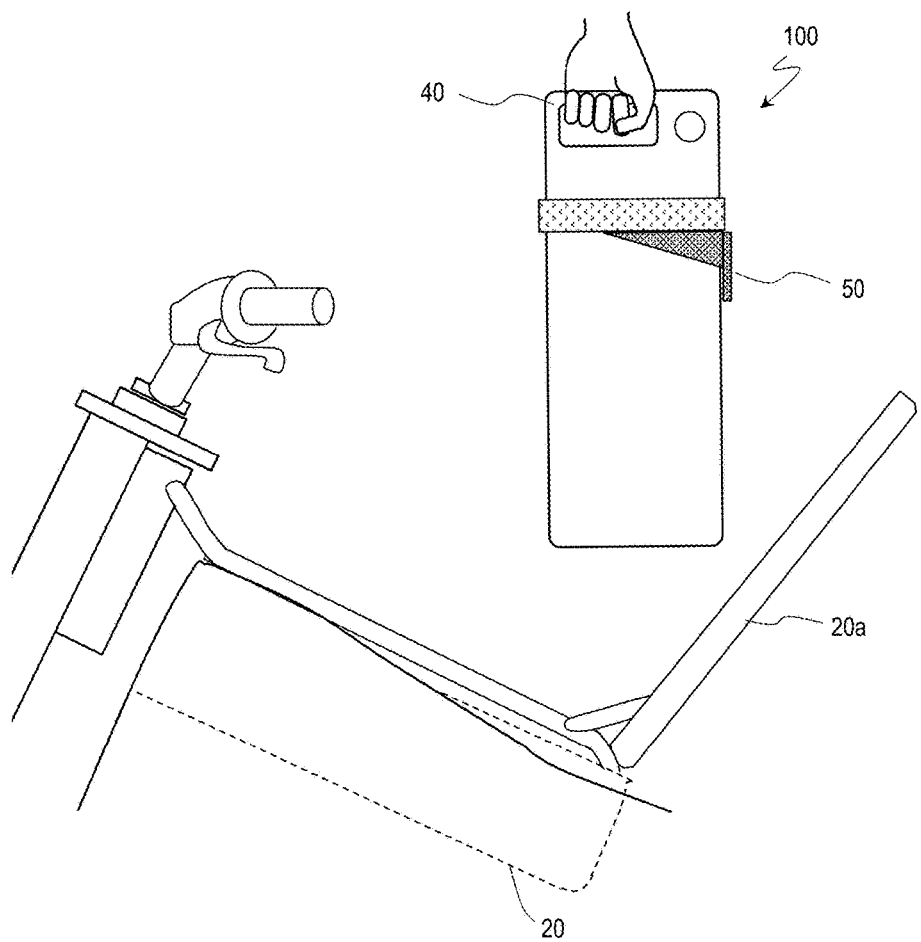
FIG. 10 shows the user having released the assisting grip 50 from his/her hand and grasping the battery pack 100 with only the main grip 40.

FIG. 8 through FIG. 10 show an example of a procedure of pulling out the battery pack 100 from the battery accommodation case 20. FIG. 8 through FIG. 10 show an operation of pulling out the battery pack 100 as seen from behind the back of the user standing facing a side surface of the electric bicycle 1. For the sake of simplification, only the hand of the user is shown but the body of the user is not shown.

FIG. 8 shows that the user picks up the assisting grip 50 of the battery pack 100 with his/her right hand to slide the battery pack 100 in the battery accommodation case 20 along a shorter side thereof (shorter axis of the battery pack 100), and then detaches the battery pack 100 from the battery accommodation case 20. When the battery pack 100 is detached, a moment of force is generated to rotate the battery pack 100 in a direction in which the position of the center of gravity G is moved vertically downward using the assisting grip 50 as the fulcrum. Along with the rotation of the battery pack 100, the main grip 40 is moved vertically upward. Namely, the main grip 40, which has been located in a bottom portion of the battery accommodation case 20, automatically appears and moves toward the user. As a result, the user easily grasps the main grip 40 with his/her hand different from the hand grasping the assisting grip 50.

FIG. 9 shows the state immediately before the user replaces the assisting grip 50 with the main grip 40 as the grip to be grasped. Since the main grip 40 is directed upward, the user easily grasps the main grip 40 with his/her left hand.

FIG. 10 shows that the user releases the assisting grip 50 from his/her right hand so as to hold the battery pack 100 with only with his/her left hand grasping the main grip 40. The user is able to carry the battery pack 100 in the state where the longer axis of the battery pack 100 is parallel or substantially parallel to the vertical direction. Thus, the battery pack 100 has good portability.

As described above, the main grip 40 and the assisting grip 50 are preferably located on the same side with respect to the plane P (FIG. 7). Thus, a series of operations from the operation of starting the detachment of the battery pack 100 using the assisting grip 50 until the operation of carrying the battery pack 100 using the main grip 40 are performed smoothly.

Now, a procedure of attaching the battery pack 100 to the battery accommodation case 20 will be described.

It is now assumed that, as shown in FIG. 10, the user holds the battery pack 100 while grasping the main grip 40 with his/her left hand. At this point, the longer axis direction of the battery pack 100 is parallel or substantially parallel to the vertical direction.

Next, the user grasps the assisting grip 50 with his/her right hand. Then, as shown in FIG. 9, the battery pack 100 is slightly inclined from the vertical direction. However, at this point, the degree of inclination is small, and it is still difficult to insert the battery pack 100 along the shorter axis thereof into the battery accommodation case 20. Therefore, the user makes a motion of increasing the degree of inclination so that the shorter axis direction of the battery pack 100 is parallel or substantially parallel to a depth direction of the battery accommodation case 20.

Figure 11:
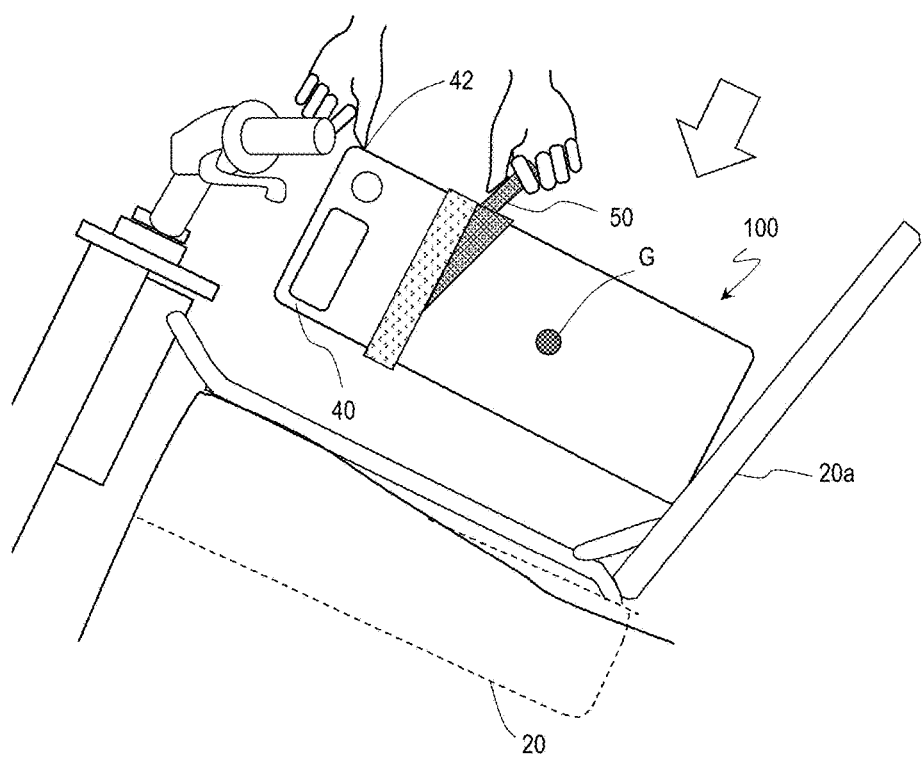
FIG. 11 shows the battery pack 100 largely inclined by the user pressing a corner portion 42 of the battery pack 100 with his/her finger.

FIG. 11 shows the battery pack 100 largely inclined by the user pressing a corner portion 42 of the battery pack 100 with his/her finger. Considering that the base of the assisting grip 50 is the center of rotation, until the state shown in FIG. 11 is obtained from the state shown in FIG. 9, the moment of force produced by the finger pressing the corner portion 42 is larger than the moment of force to rotate the position of the center of gravity G.

When the shorter axis direction of the battery pack 100 becomes parallel or substantially parallel to the depth direction of the battery accommodation case 20, the user reduces the force of pressing the corner portion 42 with his/her finger, and retains the battery pack 100 with the posture thereof being generally secured. Then, the user slides the battery pack 100 into the battery accommodation case 20 in the direction represented by the arrow in FIG. 11 (shorter axis direction of the battery pack 100). Thus, the battery pack 100 is accommodated in the battery accommodation case 20.

The user may press the corner portion 42 of the battery pack 100 with his/her palm. Alternatively, the user may pull the main grip 40 in a vertically downward direction. In this case also, the same moment of force as that in the case where the corner portion 42 is pressed is given to the battery pack 100.

The user may insert the battery pack 100 into the battery accommodation case 20 with one hand. For example, the user may grasp the assisting grip 50 with the palm and/or a finger (except for the thumb) of one hand and use the thumb of the same hand to press a portion of the battery pack 100 in the vicinity of the assisting grip 50. The rotation of the battery pack 100 is regulated using the base of the assisting grip 50 as the fulcrum and using a portion of the battery pack 100 touched by the thumb as the point of load. In this manner, the user is able to retain the shorter axis direction of the battery pack 100 to be parallel or substantially parallel to the depth direction of the battery accommodation case 20 even with one hand.

Now, another position of the assisting grip 50 will be described. Referring to FIG. 7 again, there is a plane Q, which passes the central point of the battery pack 100 in the longer axis direction (longer side extending in the Y axis direction) and is parallel or substantially parallel to the plane P. Preferably, the main grip 40 and the assisting grip 50 are located on the same side with respect to the plane Q. A reason for this is as follows. As shown in FIG. 4, the battery pack 100 is accommodated in the battery accommodation case 20 while being inclined with respect to the vertical direction. Therefore, it is considered that, when the assisting grip 50 is located at a relatively upper position (e.g., a position in the upper half of the battery pack 100), the user grasps the assisting grip 50 more easily.

In the battery pack 100 of the present preferred embodiment, the main grip 40 is at least partially in the plane $K_{XZ}$, which is an end surface on the −Y axis side of the longer side of the battery pack 100. The main grip 40 is provided in a space that does not significantly contribute to the mass of the battery pack 100 (FIG. 7). Therefore, the position of the center of gravity G of the battery pack 100 is located on the +Y axis side with respect to the plane Q. The shape of the battery pack 100 in the present preferred embodiment also satisfies the preferred relationship between the positions of the main grip 40 and the assisting grip 50 and the plane P.

The power output connector 30 is preferably located on the same side as the main grip 40 and the assisting grip 50 with respect to the plane P and the plane Q, and on the side of the opening. Because of such an arrangement, the user is easily able to connect the power input connector 22 with the power output connector 30 after the battery pack 100 is attached to the battery accommodation case 20.

Hereinafter, with reference to FIG. 12 through FIG. 15, various modifications of the battery pack 100 will be described.

Figure 12:
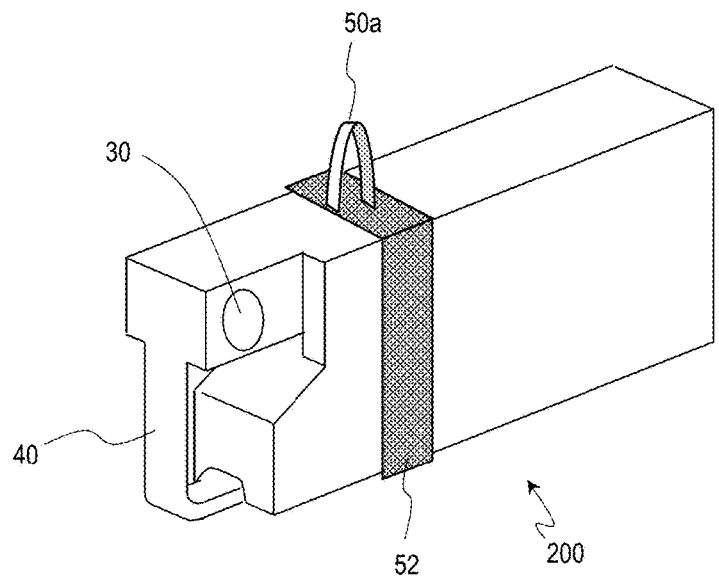
FIG. 12 is an external isometric view of a battery pack 200 according to a modified preferred embodiment of the present invention.

FIG. 12 is an external isometric view of a battery pack 200 according to a modified preferred embodiment of the present invention. The battery pack 200 includes an assisting ring 50a secured to the attachment band 52, instead of the assisting grip 50. The assisting ring 50a is another form of a grip and is preferably made of, for example, nylon. Therefore, the assisting ring 50a is easily deformed. For example, when the battery pack 200 is accommodated in the battery accommodation case 20 and the lid 20a is returned to the original position thereof, the assisting ring 50a is pressed by an inner surface of the lid 20a to be deformed. The assisting ring 50a does not prevent the lid 20a from being closed, and thus the lid 20a is locked with certainty. The load bearing performance and the flex resistance performance of the assisting ring 50a also vary similar to those of the assisting grip 50.

Figure 13:
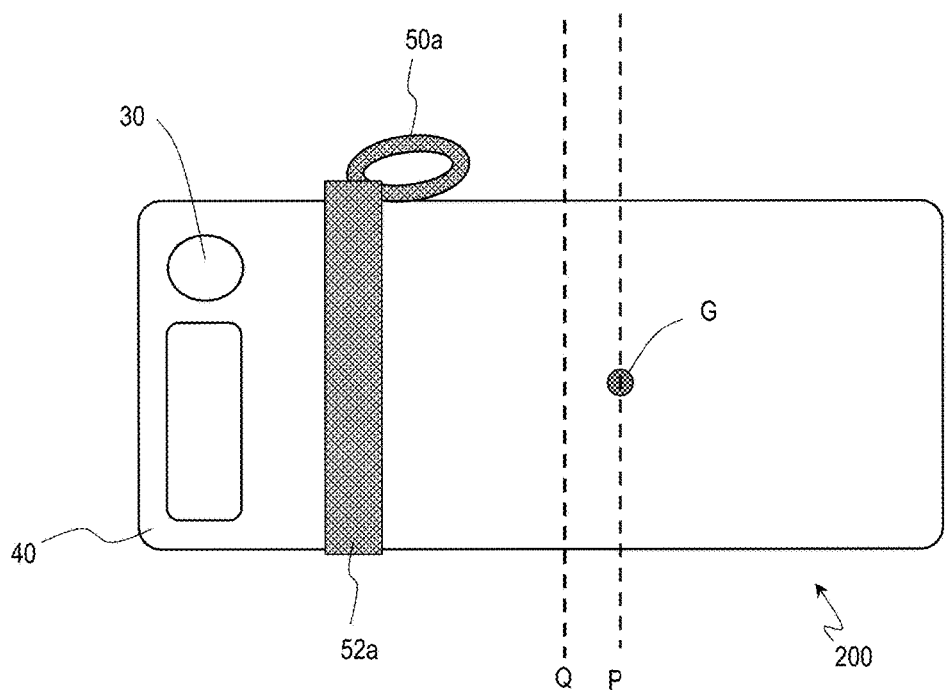
FIG. 13 shows the relationship between the positions of the main grip 40 and an assisting ring 50a and the position of the center of gravity G.

FIG. 13 shows the relationship between the positions of the main grip 40 and the assisting ring 50a and the position of the center of gravity G of the battery pack 100. The plane P and the plane Q are defined in the same manner as in FIG. 7. With such a positional arrangement, the battery pack 200 behaves in the same manner as the battery pack 100 including the assisting grip 50 by the same kinetic principles. Since the location of the power output connector 30 is not changed, the battery pack 200 provides substantially the same advantages as that of the battery pack 100.

Figure 14:
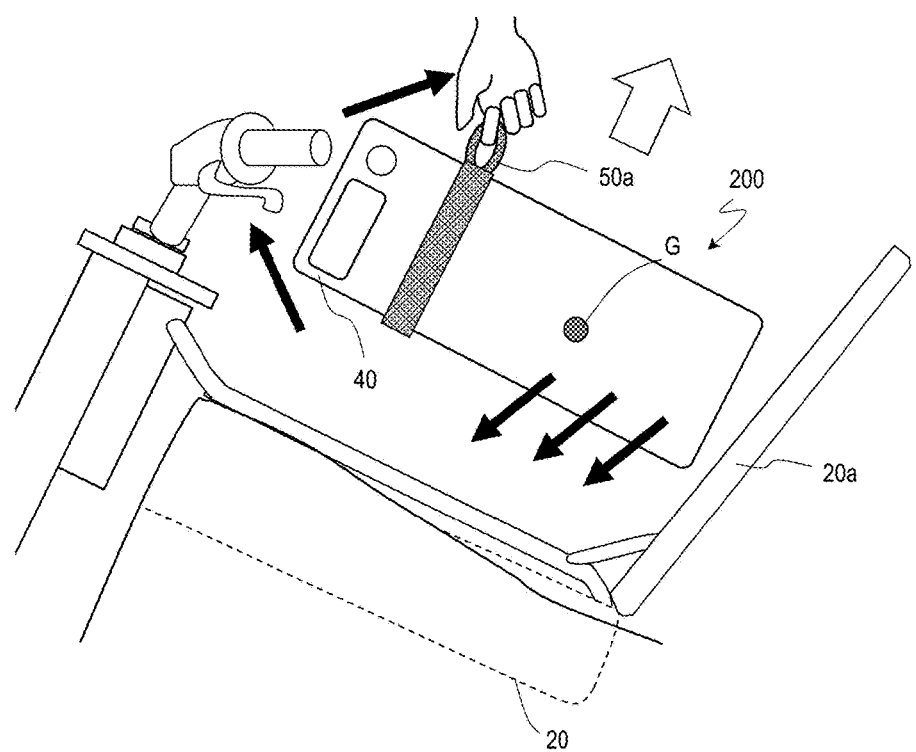

FIG. 14 shows that the user detaches the battery pack 200 by using the assisting ring 50a. Like in the case where the assisting grip 50 is used, the battery pack 200 is rotated with the base of the assisting ring 50a as the fulcrum. As a result, the main grip 40 is directed vertically upward.

Figure 15:
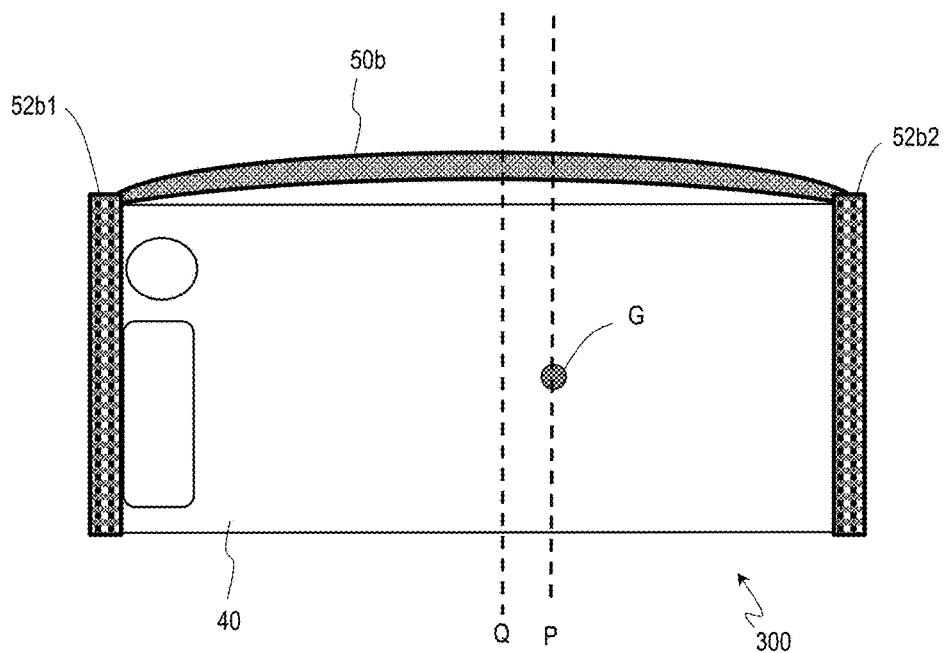
FIG. 15 is an external view of a battery pack 300 according to a modified preferred embodiment of the present invention.

FIG. 15 is an external view of a battery pack 300 according to another modified preferred embodiment of the present invention. The battery pack 300 includes attachment bands 52b1 and 52b2 and an assisting band 50b secured to the attachment band 52b1 and 52b2. The assisting band 50b is another form of a grip and is also preferably made of, for example, nylon, and extends between both of the two ends of the battery pack 300 in the longitudinal direction (Y axis direction).

The relationship between the planes P and Q described above and the assisting band 50b will be described. As shown in FIG. 15, a portion of the assisting band 50b is located on the +Y axis side with respect to the plane P or the plane Q. However, it is sufficient that at least a portion of the assisting band 50b is located on the −Y axis side with respect to the plane P. A reason for this is that as long as the user grasps at least a portion of the assisting band 50b to detach the battery pack 300 from the battery accommodation case 20, the main grip 40 is directed vertically upward for the same reason as that of the battery pack 100 or 200.

The relationship between the assisting band 50b and the plane Q is substantially the same as described above. It is sufficient that at least a portion of the assisting band 50b fulfills the condition of being located on the −Y axis side with respect to the plane Q. In the case where the assisting band 50b is provided, the user has an improved degree of freedom as to which portion of the assisting band 50b is to be grasped. As long as the above-described condition is fulfilled, the user is able to choose a position easier to grasp than the assisting grip 50 or the assisting ring 50a.

Since the location of the power output connector 30 is not changed, the battery pack 300 provides the same or substantially the same advantages as that of the battery pack 100.

In the above-described preferred embodiments, the battery pack 100 is described as including one power output connector 30. In this case, the power output connector 30 is assumed to be usable for both charging and discharging. Alternatively, the battery pack 100 may include a connector for charging and a connector for discharging. The latter may function as the power output connector 30 described above. There may also be a case in which, in the state where the battery pack 100 is attached to the electric bicycle 1, the battery pack 100 is charged by using a charging plug of a charging station or the like. In such a case, the above description on the position of the power output connector is also applicable to the connector for charging.

In the above-described preferred embodiments, the longer axis and the shorter axis are preferably perpendicular or substantially perpendicular to each other. The longer axis and the shorter axis do not absolutely need to be perpendicular to each other. It is sufficient that the longer axis and the shorter axis are not parallel to each other. Therefore, the plane $K_{XY}$ including the longer axis and the plane $K_{XZ}$ including the shorter axis do not absolutely need to be perpendicular to each other.

Preferred embodiments of the present invention are useful for electric vehicles that obtain a propulsive force by use of electric power from a detachable battery pack, for example, vehicles including at least one wheel, snowmobiles, helicopters, outboard motors, jet propellers, and the like.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

This application claims priority to Japanese Patent Applications No. 2016-050021 filed on Mar. 14, 2016, the entire contents of which are hereby incorporated by reference.

What is claimed is:

1. A battery pack for an electric vehicle, the battery pack being attachable to, and detachable from, the electric vehicle, the battery pack comprising:
    a battery pack main body having a longer axis and a shorter axis that are not parallel to each other;
    a virtual first plane of the battery pack main body including the shorter axis and a first end surface of the battery pack main body and not including the longer axis, a virtual second plane of the battery pack main body including the longer axis and a second end surface of the battery pack main body, and a virtual third plane of the battery pack main body perpendicular or substantially perpendicular to the longer axis and including a center of gravity of the battery pack main body;
    a first grip at least partially in the first plane, a location of the first grip allowing the battery pack to be carried such that the longer axis extends in a vertical direction; and
    a second grip at least partially in the second plane, a location of the second grip allowing the battery pack to slide in the electric vehicle along the first plane at a time of detachment of the battery pack from, and/or attachment of the battery pack to, the electric vehicle; wherein
    the first grip and at least a portion of the second grip are located on a same side of the battery pack with respect to the third plane; and
    the second grip is attached to the battery pack main body.

2. The battery pack according to claim 1, wherein the second grip is spaced away from the first grip by a predetermined distance.

3. The battery pack according to claim 1, wherein the second grip is smaller than the first grip.

4. The battery pack according to claim 1, wherein the second grip is able to be deformed.

5. The battery pack according to claim 1, further comprising:
    at least one battery cell; and
    a power output connector electrically connectable with the electric vehicle; wherein
    the first grip, at least a portion of the second grip, and the power output connector are located on a same side with respect to the third plane.

6. The battery pack according to claim 1, wherein the second grip is entirely located on a same side with respect to the third plane.

7. The battery pack according to claim 1, wherein the power output connector is located in a corner portion of the battery pack.

8. An electric vehicle comprising:
    the battery pack according to claim 1; and
    a case accommodating the battery pack, the case including an inner wall parallel or substantially parallel to the virtual first plane; wherein
    the inner wall guides the battery pack at a time of attachment of the battery pack to, and/or detachment of the battery pack from, the case.

9. The electric vehicle according to claim 8, wherein the case accommodates the battery pack such that the battery pack is inclined with respect to the vertical direction.

10. The electric vehicle according to claim 8, wherein the battery pack includes at least one battery cell and a power output connector that outputs electric power of the at least one battery cell; and
    the power output connector is located in an upper portion of the battery pack when the battery pack is in an inclined state.

11. The electric vehicle according to claim 10, wherein the case accommodates a power input connector; and
    the power output connector and the power input connector are connected with each other at an upper portion of the battery pack when the battery back is in an inclined state.

12. The electric vehicle according to claim 11, further comprising:
    an electric motor drivable by electric power received via the power input connector; and
    a driver to transmit a driving force of the electric motor.

* * * * *